Aug. 7, 1945.    L. McCULLOCH    2,381,299
HYGROMETER
Filed March 13, 1943
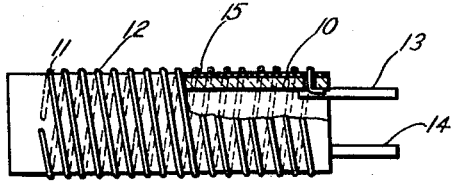
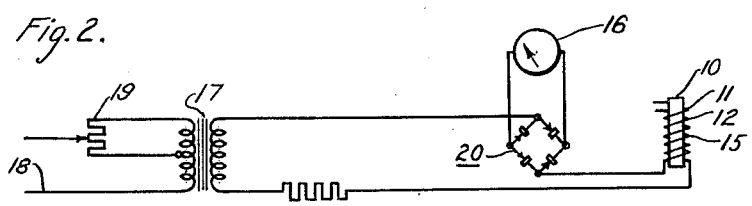
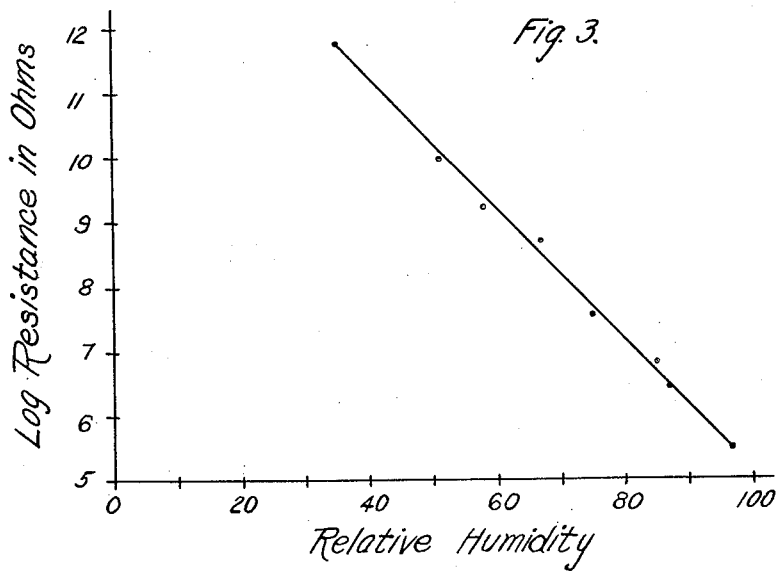
WITNESSES:
Alice P. Howell
Wm. C. Groome
INVENTOR
Leon McCulloch.
BY
Ezra W. Savage
ATTORNEY Patented Aug. 7, 1945

2,381,299

UNITED STATES PATENT OFFICE 2,381,299

HYGROMETER

Leon McCulloch, Pittsburgh, Pa., assignor to Westinghouse Electric Corporation, East Pittsburgh, Pa., a corporation of Pennsylvania Application March 13, 1943, Serial No. 479,071

4 Claims. (Cl. 201—76)

This invention relates, generally, to hygrometers and, more specifically, to electric hygrometers of the general type described in research papers R. P. 1102 and R. P. 1265 prepared by F. W. Dunmore and published by the National Bureau of Standards, in 1938 and 1939, respectively.

In the manufacture of hygrometers it has been difficult to find a humidity sensitive material which is reasonably constant throughout an adequate range of temperatures. The well known hygroscopic material, lithium chloride, has been utilized in hygrometers but it is subject to the objection that it has a low viscosity in solution and must necessarily be applied to a porous member or base. When employed on a porous member it is difficult to provide a thin layer which responds rapidly to changes in humidity. Further, the porous material will take up a certain amount of moisture thus rendering the hygrometer less accurate.

It has also been found that lithium chloride will crystallize below 15% relative humidity thus establishing a limit well within a range in which it is generally desired to utilize the hygrometer. The foregoing objections to lithium chloride point to the desirability of finding a more universal material.

The object of the invention is to provide a hygrometer which responds quickly to changes in humidity throughout a wide range.

It is also an object of the invention to provide a hygrometer, the utility of which is not impaired by the crystallization of the humidity sensitive material.

A more specific object of the invention is to provide a humidity sensitive material for hygrometers that possesses constant characteristics and that may be readily and economically applied.

For a fuller understanding of the nature and objects of the invention reference may be had to the following detailed description taken in conjunction with the accompanying drawing, in which:

Figure 1 is a view in side elevation of a hygrometer unit constructed in accordance with this invention, having a portion broken away, to show details of the structure;

Fig. 2 is a circuit diagram showing the hygrometer unit connected in circuit relation with a meter calibrated to indicate a function of the humidity; and Fig. 3 is the curve obtained by plotting the logarithms of the ohmic resistance values of the humidity sensitive material for different percentages of humidity over relative humidity.

Referring now to the drawing and Figure 1 in particular, the humidity sensitive element comprises a base member 10 which may be made from suitable material, many of which are well known in the art. In building a hygrometer, in accordance with this invention, a Pyrex glass tube was found to be satisfactory. The size of the tube can be predetermined when the conditions under which it is to be utilized are known. For example, when the humidity sensitive element is to be utilized with a galvanometer of a predetermined capacity connected across a known voltage it is possible to calculate the amount of current that should flow to give readable deflections of the needle and thereby find the length and size of the electrodes. This information together with conditions of use enable the selection of a Pyrex tube that may be conveniently employed.

In the modification of the invention illustrated in Fig. 1, the electrodes 11 and 12 are wound around the tube to simulate helices. As illustrated, the wires are disposed parallel to one another with a predetermined spacing.

For convenience in connecting the humidity sensitive element in the electric circuit, binding posts 13 and 14 are mounted on the tube 10 in some suitable manner and electrically connected to the electrodes 11 and 12, respectively. The binding posts are represented by cylindrical members but may be of some convenient construction for making the necessary electrical connections.

When a Pyrex tube is utilized as a base 10 it is usually roughened by some well known method such as sand papering or subjecting it to a sand blast. After it has been properly roughened it is coated with a water solution of beryllium fluoride. The coating 15 as shown is somewhat magnified. The thickness of the coating may readily be predetermined. In building humidifiers it has been found that by making the coating 15 thin the element responds much more quickly to changes in humidity. It is also possible to control the range of the element by preparing coatings from solutions carrying different amounts of the beryllium fluoride.

It has been found that beryllium fluoride is non-crystalline. A test made with a solution of beryllium fluoride in water has revealed that after ten years the beryllium fluoride did not crystallize. Further, the viscosity of a solution of beryllium fluoride varies with the humidity of the air.

It has also been found that beryllium fluoride is non-corrosive. Further, its properties remain substantially constant under ordinary conditions which render it highly desirable as a humidity sensitive material for hygrometers.

While many methods may be employed for applying the solution of beryllium fluoride to the Pyrex glass, good results have been obtained by dipping a base comprising a Pyrex tube in a boiling water solution containing 3% beryllium fluoride. After the beryllium fluoride has thus been applied the excess is allowed to drip off in suitable atmosphere conditions, for example, mounting it in an atmosphere of high humidity. By providing a thin coat of the beryllium fluoride, a hygrometer is obtained which has a small time lag.

After the coating of beryllium fluoride has been applied it is dried and to meet certain conditions may be baked at a temperature of the order of about 300° C., care being observed not to decompose the fluoride. Analysis of the material from which the solution was made revealed that the humidity sensitive material comprised beryllium fluoride 87.1% by weight, beryllium oxide 3.9% by weight and water about 9% by weight.

In the modification illustrated, the electrodes are applied in the form of a double helix by winding suitable conductors on the Pyrex tube or base 10. In the structures made nickel wires of from 1 to 3 mils in diameter were employed. In order to insure permanence the electrodes could be made from platinum or gold.

Another method of applying the electrodes is by depositing a layer of a suitable metal or wrapping a suitable metallic ribbon around the base and etching it into the double helix described hereinbefore.

In an element constructed, parallel electrodes were disposed on Pyrex glass of ¾" in diameter. Nickel wire of .002 inch in diameter was selected and about ten turns applied for each electrode to the ¾" tube. The electrodes were spaced about ¾" apart. This tube was then coated by immersing it in a 3% water solution carrying 3% beryllium fluoride raised to a boiling temperature. After the excess material had dripped off and the applied coat of beryllium fluoride had become stable, the humidity element carrying the electrodes 11 and 12 was connected across the galvanometer 16 for the purpose of measuring the current flow for different humidity conditions and determining the resistance of the material 15.

In Fig. 2 the galvanometer and humidity sensitive element are shown connected across a source of power 18. In this particular circuit diagram the galvanometer 16 and the humidity sensitive element are connected to a transformer 17 which in turn is connected to the source of power 18. A rheostat 19 is provided for controlling the voltage applied to the transformer 17. In this embodiment of the invention, rectifiers shown generally at 20 are provided to supply direct current to the galvanometer. Unless required the humidity sensitive element should be utilized with an alternating current source of power supply since this prevents polarization of the beryllium fluoride.

A test was made on a hygrometer constructed in accordance with the foregoing by disposing the humidity sensitive element in a closed container above a saturated solution of a salt of known humidity, that is having a predetermined capacity for giving water to the atmosphere, and the results obtained are given in the following table:

| Salt | Rel. humidity | Resistance by D. C., 500 v. Bridge, ohms | Log resistance in ohms |
|---|---|---|---|
| | Per cent | | |
| $K_2SO_4$ | 97 | $0.3 \times 10^6$ | 5.5 |
| NaCl | 75 | $40.0 \times 10^6$ | 7.60 |
| NaBr | 58 | $1,800.0 \times 10^6$ | 9.26 |
| $CrO_3$ | 35 | $600,000.0 \times 10^6$ | 11.78 |
| $K_2CO_3$ | 43 | $250,000.0 \times 10^6$ | 11.40 |
| $COCl_2$ | 67 | $500.0 \times 10^6$ | 8.75 |
| $Ca(NO_3)_2$ | 51 | $10,000.0 \times 10^6$ | 10.00 |
| KCl | 85 | $7.0 \times 10^6$ | 6.85 |
| $Na_2CO_3$ | 87 | $2.8 \times 10^6$ | 6.45 |

The logs of the ohmic resistance values were then calculated and the curve shown in Fig. 3 plotted.

The points representing the logarithms of the resistances found for known relative humidities are slightly scattered because of certain temperature variations that were hard to avoid and small errors that ordinarily occur in the humidity assumed. The curve, if errors had not occurred, would be a straight line as shown.

The size of the electrodes and their length may readily be calculated by known methods which need not be described in detail herein. Having arrived at the size of the electrodes and their spacing, a base or tube 10 may be selected to suit the predetermined requirements of use.

It is also pointed out that a hygrometer can be made without the use of electrodes. When a predetermined coating of beryllium fluoride has been applied to a base it may be exposed to different humidity conditions and then weighed to determine how much moisture was taken up. When the weight of moisture absorbed has been determined the humidity can be readily arrived at by reference to a table or curve prepared in accordance with well known methods.

Since numerous changes may be made in the above described structure and different embodiments of the invention may be made without departing from the spirit and scope thereof, it is intended that all matter contained in the above description or shown in the accompanying drawing shall be interpreted as illustrative and not in a limiting sense.

I claim as my invention:

1. In a humidity indicator, in combination, a plurality of electrodes disposed in spaced relation, and beryllium fluoride sensitive to changes in humidity disposed in electrical contact with the electrodes and exposed to the atmosphere.

2. In a humidity indicator, in combination, a base, a thin layer of beryllium fluoride carried by the base, and electrodes disposed in spaced relation to one another in electrical contact with the layer of beryllium fluoride.

3. In a humidity indicator, in combination, non-crystalline beryllium fluoride and a base to which the beryllium fluoride is applied.

4. In a humidity indicator, in combination, non-crystalline beryllium fluoride and means for carrying the beryllium fluoride, the beryllium fluoride being disposed to present a predetermined surface area to the atmosphere.

LEON McCULLOCH.